June 19, 1956 T. E. MOON 2,751,484
ELECTRIC SOLDERING IRON
Filed June 22, 1955 2 Sheets-Sheet 1
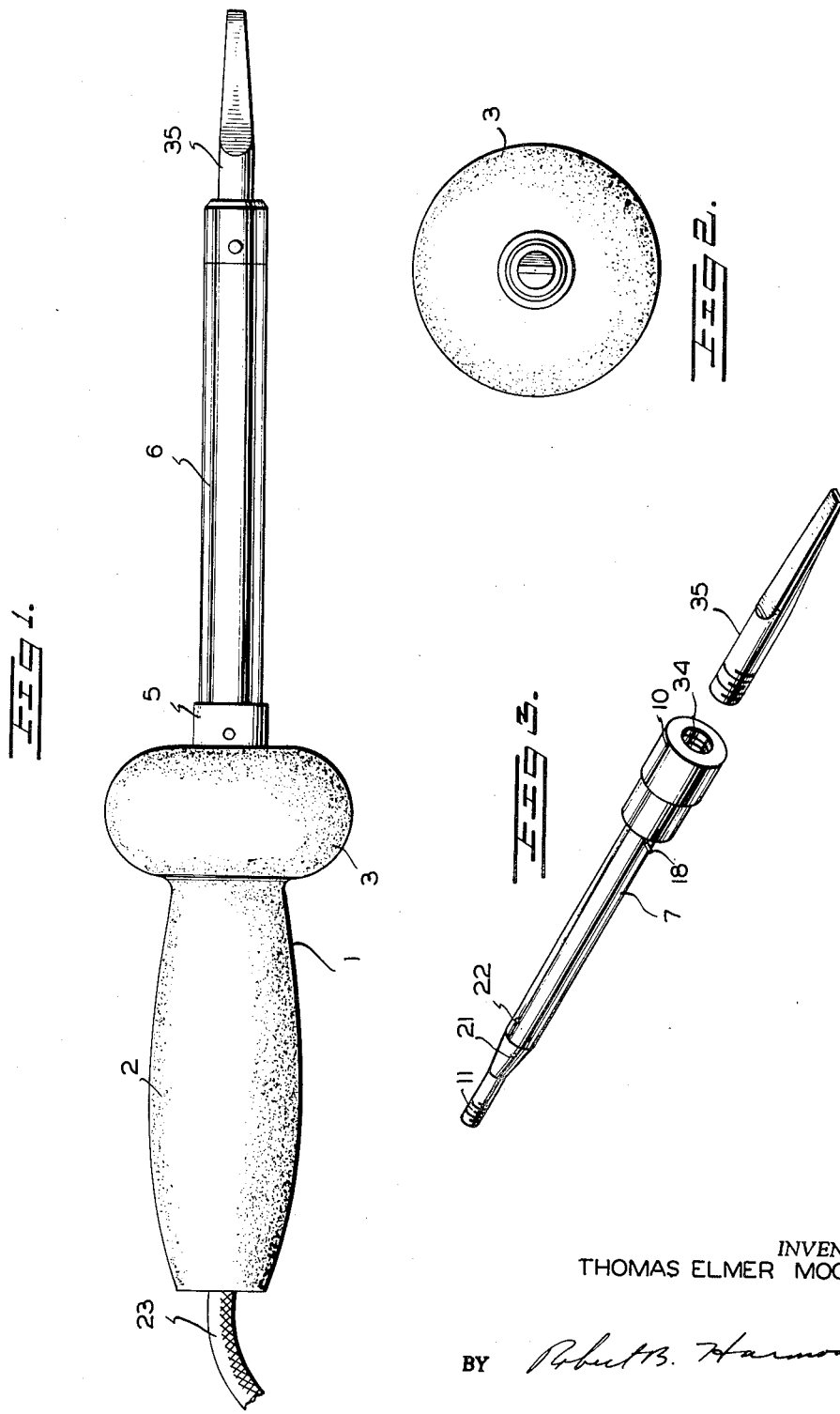
INVENTOR
THOMAS ELMER MOON
BY *Robert B. Harmon*
ATTORNEY June 19, 1956  T. E. MOON  2,751,484
ELECTRIC SOLDERING IRON
Filed June 22, 1955  2 Sheets-Sheet 2
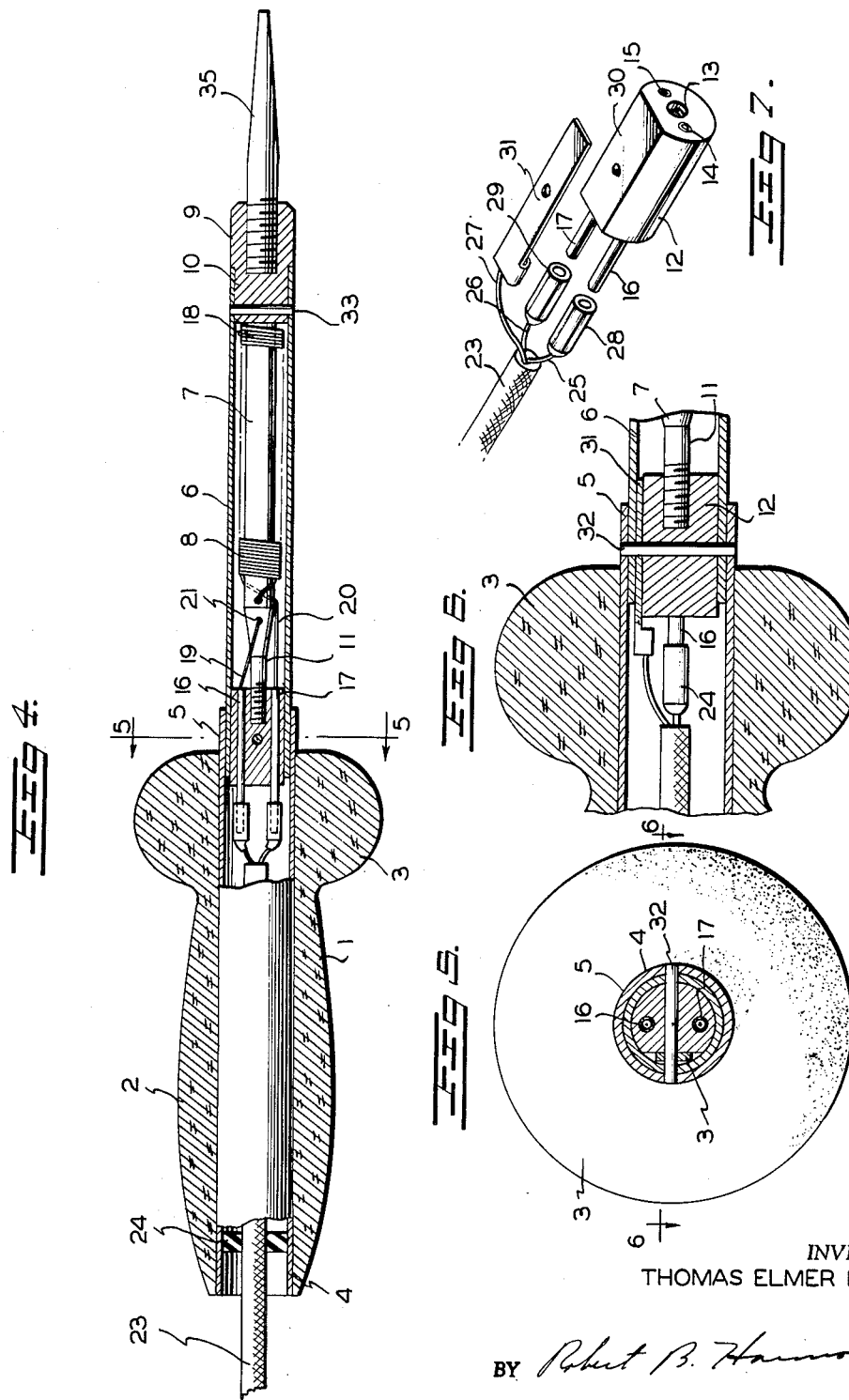
INVENTOR
THOMAS ELMER MOON
BY *Robert B. Hannon*
ATTORNEY United States Patent Office 2,751,484
Patented June 19, 1956

2,751,484
ELECTRIC SOLDERING IRON
Thomas Elmer Moon, Norfolk, Va.

Application June 22, 1955, Serial No. 517,270

3 Claims. (Cl. 219—26)

This invention relates generally to electric soldering irons and more particularly to impovements in heat contol in such irons.

The primary object of this invention is to provide an electric soldering iron which will operate efficiently on a relatively low power input, while maintaining a sufficient tip-temperature for rapid and continuous operation.

A more specific object of this invention is to provide an electric soldering iron in which the choice of materials and the general assembly of the parts made from these materials is such that heat, generated in the iron, is efficiently fed forwardly to the tip and deterred from being fed toward the handle.

Another object of this invention is to provide an electric soldering iron in which the choice of insulated resistance wire and the means of assembly thereof within the iron is such as to prevent short circuits while maintaining excellent heat transmitting qualities.

A further object of this invention is to provide a novel means of assembly between the tip and the main body of the iron so as to facilitate removal of the tip "nubbin" after heavy use of the iron.

Another object of this invention is to provide an electric soldering iron with a minimum number of parts which lends itself to mass production at a minimum cost.

Still another object of this invention is to provide an electric soldering iron which is relatively light in weight so as to materially reduce operator fatigue.

With the foregoing and other objects in view, this invention resides in the following specification and appended claims, certain embodiments and details of construction of which are illustrated in the accompanying drawings, in which:

Figure 1 is an overall plan view of the electric soldering iron comprising this invention;

Figure 2 is an end view of the soldering iron as viewed from the tip end of Fig. 1;

Figure 3 is an exploded detailed view in perspective of the mandrel and tip assembly of the soldering iron;

Figure 4 is a sectional view in side elevation of the soldering iron;

Figure 5 is a sectional view taken along the lines 5—5 of Fig. 4;

Figure 6 is an enlarged view of the central portion of the soldering iron, as shown in Fig. 4; and Figure 7 is an exploded detail view, in perspective, of the terminal block lead wire assembly.

Referring more particularly to Figures 1 and 4, the soldering iron is shown generally at 1 having a handle 2 with an enlarged heat shield portion 3. The handle 2 is preferably made of cork because of its light weight and poor heat conducting characteristics.

The handle 2 is provided with a bore which, in the final assembly of the iron, accommodates therein an insulating sleeve 5, the sleeve 5 being held within the bore 4 of handle 3 by a tight friction grip. The sleeve 5 is preferably made of fiberglass impregnated with silicone and acts to deter the transmission of heat to the handle, as well as further insulating the operator's hand from the internal connections of the iron. The sleeve 5 also adds rigidity to the cork handle.

Fitted within the forward portion of sleeve 5 in telescoping relationship therewith is a sleeve 6 preferably made of 18.8 percent of stainless steel. This particular steel was selected because of its commercial availability and relatively low heat transmission characteristics. It is obvious that a number of other grades of steel and types of metal alloys, however, might be used.

A mandrel 7 (Figures 3 and 4) is provided to carry the heating element 8. This is provided at one end with an enlarged head portion 9 having a reduced portion 10 which fits tightly within the end of the sleeve 6. The diameter of the head portion 9 and the outside diameter of the sleeve 6 are equal to give a smooth contour to the iron. Mandrel 7 is provided at its other end with a reduced threaded section 11. The mandrel 7 is preferably made of an aluminum alloy having high heat conducting qualities.

At the junction of sleeves 5 and 6, and carried within sleeve 6, in frictional fit relationship therewith, is a terminal insulator block 12 of micalex or other material of like character, which is highly resistant to heat and is an electrical non-conductor. The block 12 is internally threaded at 13 to receive the threaded section 11 of the mandrel 7. The block 12 is provided with axially extending bores 14 and 15, into which are inserted hollow copper terminals 16 and 17, the terminal members being tightly held within the bores by friction. An alternate means of constructing the block 12 is to mold the same with the terminals in place, thus avoiding the necessity of machining the bores 14 and 15.

The heating element 8 consists of a resistance wire encased in fiberglass tubing. The element 8 is wrapped about the mandrel 7, and is retained forwardly of the mandrel by a pin 18. The terminal ends 19 and 20 of element 8 are threaded through bores 21 and 22 of the mandrel 7 and thence through hollow terminals 16 and 17 in block 12. Protruding bare wire portions of the ends 19 and 20 are reversely bent into contact with the outer surface of terminals 16 and 17.

A line cord 23 is inserted into the iron by way of the rear end of the handle 2 and is concentrically spaced from the sleeve 5 therein by means of a rubber bushing 24. The cord 23 (Figure 7) includes two or three stranded or tinsel-type conductors 25, 26, and 27, depending on whether or not the place of use utilizes a ground line in its power system. Conductors 25 and 26 are connected to terminal sleeves 28 and 29 which, during assembly of the iron, are slipped over the terminals 16 and 17 and the bare end portions 19 and 20 of element 8. The sleeves 28 and 29 are then crimped to hold the live cord 23 securely to the terminal block 12. The flat section 30 on block 12 accommodates a ground terminal 31 attached to conductors 27.

In order to hold the various parts of the iron together in a simple yet secure fashion, transversely placed dowel pins are utilized. A split pin of spring steel is quite satisfactory for the purpose. One pin 32 is illustrated in Figure 6, as extending through sleeves 5 and 6, the ground terminal 21, and the block 12 holding these parts against relative longitudinal movement. A similar pin 33 is inserted through the forward end of sleeve 6 and portion 10 of mandrel 7 to hold these two parts securely together.

The enlarged head portion 9 of mandrel 7 is tapped at 34 to receive a threaded tip 35 in loose fitting relationship therewith. The purpose of the relatively loose fit between the mandrel and the tip is to prevent freezing of the threads after severe use of the iron, thereby facilitating tip replacement. However, the actual removal of a used tip was found to be aided—not only by an original loose fit between threads—but by the creation of an aluminum alloy deposit on the threads of the copper tip 35. The deposit is due, over a period of time, to electrolytic action between the metals in moist air, which in itself is very slightly acidic.

In use the iron 1 is switched on by means, not shown, and the heating element 8 will convert the electrical energy to heat energy which is fed from mandrel 7 to tip 35. The enlarged section 9 of the mandrel 7 acts as a heat reservoir and permits rapid and continuous operation without such severe drops in tip temperature as would lead to the production of cold joints.

The choice of materials in the design of this soldering iron and relative placement of the parts is such that the better heat transmitting parts; namely, the element 8 and the mandrel 7 with reservoir 9, lead heat forwardly to the tip 35 while the heat deterring parts; namely, the sleeve 6, the block 12, the sleeve 5, and the handle 2 tend to block heat transmission rearwardly of the iron. This arrangement permits the use of less power to maintain a good tip temperature, desirably at the 650° F. level. The design and choice of materials also prevents excessive tip temperatures which lead to the production of cold joints due to vaporization of the solder flux.

The utilization of a fiberglass encased heating element 8 aids in assembly of the iron and substantially eliminates a heretofore cause of iron breakdown due to short circuits in mica or ceramic mounted type of heater elements. The wire of the element 8 is actually free to expand and contract within the fiberglass insulation due to heat changes as well as the influence of the A. C. current supply. The fiberglass casing about the resistance wire, therefore, permits simultaneously, the expansion and contraction of the resistance wire, while insulating adjacent turns, and efficiently aids in the transmission of heat to the mandrel.

It is obvious that various material substitutions may be made for those stated and that the actual assembly of the parts of the iron may be readily modified, all of such changes being readily within the scope of this invention as defined by the claims hereinafter presented.

I claim:

1. An electric soldering iron comprising a handle means of low heat conductive material, a line cord heading inwardly of said handle means, terminal means of high heat resistance material carried by said handle means, said terminal means being provided with a threaded recess, a mandrel of high heat conducting aluminum alloy directly connected at one end thereof into said recess in the terminal means, the other end of said mandrel being provided with a threaded recess, a heating element wound about said mandrel, said element comprising resistance wire encased in a fiberglass tubing and said element being electrically connected to said line cord at said terminal means, a sleeve of low heat conductive steel material connected to said handle means and enclosing said heating element, and a soldering tip connected into said mandrel threaded recess in a loosely threaded relationship.

2. An electric soldering iron comprising a handle of low heat conductive material, a line cord leading inwardly of said handle, terminal means of high heat resistance material carried by said handle, said terminal means being provided with a recess, a mandrel of high heat conducting material directly connected into said recess in the terminal means, a heating element wound about said mandrel, said element comprising resistance wire encased in a fiber glass tubing and said element being electrically connected to said line cord at said terminal means, a sleeve of low heat conductive material connected to said handle means and enclosing said heating element, and a soldering tip connected to said mandrel by a loosely threaded joint.

3. An electric soldering iron comprising a handle of low heat conductive material, a line cord leading inwardly of said handle, terminal means of high heat resistancy material carried by said handle, said terminal means being provided with a recess, a one piece mandrel of high heat conducting material directly connected into said recess in the terminal means, said mandrel including an enlarged forward heat well portion including a tip retaining means, a central heating element carrying portion and a rearwardly extending connecting portion, a heating element wound about said central portion of the mandrel, said element comprising resistance wire encased in a fiberglass tubing and said element being electrically connected to said line cord at said terminal means, a sleeve of low heat conductive material connected to said handle means and enclosing said heating element, and a soldering tip connected with said tip retaining means of the enlarged forward heat well portion of the mandrel.

References Cited in the file of this patent

UNITED STATES PATENTS

| | | |
|---|---|---|
| 1,027,337 | Holmes | May 21, 1912 |
| 1,909,061 | Lindholm | May 16, 1933 |
| 2,147,981 | Kuehl | Feb. 21, 1939 |
| 2,179,818 | Hampton et al. | Nov. 14, 1939 |
| 2,213,438 | Young | Sept. 3, 1940 |
| 2,437,747 | Kuhn et al. | Mar. 16, 1948 |
| 2,518,265 | Adamson | Aug. 8, 1950 |
| 2,619,576 | Greibach | Nov. 25, 1952 |
| 2,714,651 | Wotton | Aug. 2, 1955 |

FOREIGN PATENTS

| | | |
|---|---|---|
| 128,059 | Australia | July 8, 1948 |
| 628,657 | Great Britain | Sept. 1, 1949 |
| 663,214 | Great Britain | Dec. 19, 1951 |